(12) United States Patent
Lillibridge

(10) Patent No.: US 8,001,273 B2
(45) Date of Patent: Aug. 16, 2011

(54) PARALLEL PROCESSING OF INPUT DATA TO LOCATE LANDMARKS FOR CHUNKS

(75) Inventor: Mark David Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 12/404,842

(22) Filed: Mar. 16, 2009

(65) Prior Publication Data

US 2010/0235485 A1 Sep. 16, 2010

(51) Int. Cl.
*G06F 15/16* (2006.01)
(52) U.S. Cl. ........................................................ 709/246
(58) Field of Classification Search .................. 709/230, 709/246
See application file for complete search history.

(56) References Cited

U.S. PATENT DOCUMENTS

| | | | |
|---|---|---|---|
| 5,638,509 A | 6/1997 | Dunphy | |
| 5,990,810 A | 11/1999 | Williams | |
| 6,513,050 B1 | 1/2003 | Williams | |
| 6,727,662 B2 | 4/2004 | Konopka | |
| 6,839,680 B1 | 1/2005 | Liu | |
| 6,920,507 B1 | 7/2005 | Kley | |
| 6,938,005 B2 | 8/2005 | Iverson | |
| 6,961,009 B2 | 11/2005 | McCanne | |
| 7,047,240 B2 | 5/2006 | Sato | |
| 7,082,548 B2 | 7/2006 | Nakano | |
| 7,177,995 B2 * | 2/2007 | Yagawa | 711/162 |
| 7,185,066 B2 | 2/2007 | Noble | |
| 7,233,938 B2 * | 6/2007 | Carus et al. | 705/2 |
| 7,269,689 B2 | 9/2007 | Eshghi | |
| 7,277,958 B2 * | 10/2007 | Chung et al. | 709/231 |
| 7,444,337 B2 | 10/2008 | Zhou | |
| 7,444,349 B1 | 10/2008 | Ochotta | |
| 7,487,228 B1 | 2/2009 | Preslan | |
| 7,562,110 B2 | 7/2009 | Miloushev | |
| 7,581,170 B2 * | 8/2009 | Baumgartner et al. | 715/234 |
| 7,647,358 B2 * | 1/2010 | Rogers et al. | 707/999.2 |
| 7,660,853 B2 * | 2/2010 | Scott et al. | 709/205 |
| 7,669,101 B2 * | 2/2010 | Udell et al. | 714/738 |
| 7,698,520 B2 * | 4/2010 | Minami et al. | 711/162 |
| 7,738,380 B1 * | 6/2010 | Dubrovsky et al. | 370/235 |
| 7,761,788 B1 * | 7/2010 | McKnight et al. | 715/248 |
| 7,814,043 B2 * | 10/2010 | Uchino | 1/1 |
| 2001/0010070 A1 | 7/2001 | Crockett | |
| 2002/0052769 A1 | 5/2002 | Navani | |
| 2002/0156912 A1 | 10/2002 | Hurst | |
| 2003/0065722 A1 | 4/2003 | Leperen | |
| 2003/0101449 A1 | 5/2003 | Bentolila | |
| 2003/0140051 A1 | 7/2003 | Fujiwara | |

(Continued)

FOREIGN PATENT DOCUMENTS

WO 2006030326 A1 3/2006

(Continued)

OTHER PUBLICATIONS

Unpublished PCT/US2008/061576 filed Apr. 25, 2008 (59 pages).

(Continued)

*Primary Examiner* — Hussein A Elchanti

(57) ABSTRACT

Input data is divided into a plurality of segments, which are processed, in parallel, by respective first processing elements to locate landmarks in the segments. At least one other processing element is used to produce chunks from the input data based on positions of the landmarks provided by the first processing elements.

19 Claims, 2 Drawing Sheets

U.S. PATENT DOCUMENTS

| | | | |
|---|---|---|---|
| 2004/0103147 | A1 | 5/2004 | Flesher |
| 2004/0103413 | A1 | 5/2004 | Mandava |
| 2004/0162953 | A1 | 8/2004 | Yoshida |
| 2005/0091234 | A1 | 4/2005 | Hsu |
| 2006/0059173 | A1 | 3/2006 | Hirsch |
| 2006/0059207 | A1 | 3/2006 | Hirsch |
| 2006/0293859 | A1 | 12/2006 | Pipke |
| 2007/0220197 | A1 | 9/2007 | Lasser |
| 2007/0250519 | A1 | 10/2007 | Fineberg |
| 2007/0250670 | A1 | 10/2007 | Fineberg |
| 2008/0126176 | A1 | 5/2008 | Iguchi |
| 2009/0112945 | A1 | 4/2009 | Camble |
| 2009/0113167 | A1 | 4/2009 | Camble |
| 2010/0114980 | A1 | 5/2010 | Lillibridge |
| 2010/0198792 | A1 | 8/2010 | Camble |
| 2010/0198832 | A1 | 8/2010 | Jones |
| 2010/0205163 | A1 | 8/2010 | Eshghi |
| 2010/0235485 | A1 | 9/2010 | Lillibridge |
| 2010/0280997 | A1 | 11/2010 | Lillibridge |
| 2010/0281077 | A1 | 11/2010 | Lillibridge |

FOREIGN PATENT DOCUMENTS

| | | | |
|---|---|---|---|
| WO | 2009030326 | A1 | 3/2006 |
| WO | 2006094365 | A1 | 9/2006 |
| WO | 2006094366 | A1 | 9/2006 |
| WO | 2006094367 | A1 | 9/2006 |
| WO | 2007127248 | A2 | 11/2007 |
| WO | 2009054827 | A1 | 4/2009 |
| WO | 2009054828 | A1 | 4/2009 |
| WO | 2009054834 | | 4/2009 |
| WO | 2009131585 | A1 | 10/2009 |

OTHER PUBLICATIONS

Unpublished PCT/US2007/022629 filed Oct. 25, 2007 (35 pages).
U.S. Appl. No. 12/258,638, filed Oct. 27, 2008 (45 pages).
U.S. Appl. No. 12/260,024, filed Oct. 28, 2008 (39 pages).
U.S. Appl. No. 12/412,821, filed Mar. 27, 2009 (36 pages).
Fenstermacher et al.; "Mining Client-Side Activity for Personalization" Department of Management Information Systems, Eller College of Business and Public Administration, University of Arizona, Jun. 2002 (8 pages).
Baoyao, Zhou; ""Intelligent Web Usage Mining"" Nanyang Technological University, Division of Information Systems, School of Computer Engineering, 2004 (94 pages).
Baynote Inc.: The Collective Intelligence Platform, Online, http://www.baynote.com/technology/platform/ 2010 (1 page).
Hottolink Inc.; "Recognize" Online, http://www.hottolink.co.jp/english/reconize.html, 2009 (2 pages).
Andrejko et al.: User Characteristics Acquisition from Logs with Semantics, Slovak University of Technology in Bratislava, 2007 (8 pages).
Hongjun Lu et al: Extending a Web Browser with Client-Side Mining, Hong Kong University of Science and Technology Department of Computer Science, Clear Water Bay, Kowloon, Hong Kong, China, 2003 (12 pages).
Shankar et al.; ""Personalized Web Search Based on Client Side Ontology"" , CS 498: B.Tech Project,10. IIT Kanpur, India 2010 (9 pages).
Sendhikumar et al.; "Personalized ontology for web search personalization" Anna University, Chennai, India , 2008 (7 pages).
Shahabi et al.; "Yoda an Accurate and Scalable Web based Recommendation System?" University of SouthernCalifornia, Los Angeles, Sep. 2001 (14 pages).
Why Wubat? Website User Behavior & Analysis Tool, Wubat, Online, http://www.wubat.com/ dated on or before Oct. 12, 2010 (3 pages).
Claypool et al.; "Implicit Interest Indicators", Worcester Polytechnic Institute, Worcester, Computer Science Department Worcester Polytechnic Institute Worcester, MA 01609, USA., 2001 (8 pages).
Shahabi et al.; A Framework for Efficient and Anonymous Web Usage Mining Based on Client-Side Tracking, University of Southern California, Los Angeles, 2002 (48 pages).
Clattertrap; Online http://www.clattertrap.com; Jul. 20, 2010 (1 page).
HSNW: SRI defense technology spawns civilian application: published Jun. 29, 2010 (2 pages).
Anthony Ha: Facebook investor backs Chattertrap, a personal assistant for content, Jun. 28, 2010 (6 pages).
European Patent Office, International Appl. No. PCT/US2007/010015, Search Report and Written Opinion dated Jan. 2, 2008 (12 pages).
European Patent Office, EP 07756010.0, Examination Report dated Feb. 20, 2009 (4 pages).
Muthitacharoen Athicha, et al., "A Low-Bandwidth Network File System," Proceedings of the 18th ACM Symposium on Operating Systems Principles (SOSP '01), Oct. 2001.
L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.
You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.
Korean Intellectual Property Office, International Appl. No. PCT/US2007/0022586, Search Report and Written Opinion dated Jul. 23, 2008 (pp. 1-12).
Korean International Property Office, PCT/US2008/061576 Search Report dated Jan. 23, 2009 (2 pages).
Eshghi et al., "Jumbo Store: Providing Efficient Incremental Upload and Versioning for a Utility Rendering Service," 2007 (16 pages).
U.S. Appl. No. 10/870,783, Non-Final Rejection dated Dec. 15, 2006, pp. 1-4 and attachments.
U.S. Appl. No. 10/870,783, Notice of Allowance dated Jun. 13, 2007 (7 pages).
UK Intellectual Property Office Search Report, GB 0511574.6 dated Oct. 19, 2005 (1 page).
UK Intellectual Property Office, Examination Report, GB 0511574.6 dated Jul. 19, 2007 (6 pages).
Translation of Japanese Office Action, JP 2005-173488, Notice of Rejection dated Aug. 5, 2008 (8 pages).
Translation of German Office Action dated Jul. 7, 2006, DE 10 2005023128.4-53 (3 pages).
Translation of German Office Action dated Feb. 7, 2008, DE 10 2005023128.4-53 (6 pages).
Brin, Sergey, et al., "Copy Detection Mechanisms for Digital Documents", Department of Computer Science, Stanford University, Oct. 31, 1994, p. 1-21.
Manber, Udi, "Finding Similar Files in a Large File System," Department of Computer Science, University of Arizona, TR 93-33, Oct. 1993, (11 pages).
Rabin, M.O., "Fingerprinting by Random Polynomials," Technical Report, Center for Research in Computing Technology, Harvard University, 1981, Report TR-15-81 (14 pages).
Korean Intellectual Property Action, International Appl. No. PCT/US2007/022629 Search Report dated Jul. 24, 2008 (2 pages).
Korean Intellectual Property Office, International Appl. No. PCT/US2007/022585 Search Report dated Jul. 15, 2008 (2 pages).
U.S. Appl. No. 12/412,821, Non-Final Rejection dated Sep. 29, 2010, pp. 1-7 and attachments.
U.S. Appl. No. 12/260,024, Non-Final Rejection dated Oct. 20, 2010, pp. 1-9 and attachment.

* cited by examiner

PARALLEL PROCESSING OF INPUT DATA TO LOCATE LANDMARKS FOR CHUNKS

BACKGROUND

As the amount of information to be stored and transmitted by computer systems or other electronic devices has dramatically increased, techniques have been developed to allow for more efficient data storage and processing. In some cases, chunking algorithms have been used to achieve improved efficiency and speed. Chunking algorithms partition one or more data objects into non-overlapping chunks. By dividing one or more data objects into chunks, a system is able to identify chunks that are shared by more than one data object or occur multiple times in the same data object, such that these shared chunks are stored just once to avoid or reduce the likelihood of storing duplicate data.

One type of chunking algorithm is a landmark chunking algorithm, which performs partitioning of one or more data objects by first locating landmarks present in the one or more data objects. The landmarks are short predefined patterns of data whose locations are used in determining chunk boundaries. By convention, each landmark is considered to occur at a single position, often the position immediately following that landmark's data.

The landmark chunking algorithm then determines chunk boundaries from the landmark locations. The simplest landmark chunking algorithm places a chunk boundary at each landmark. More complicated landmark chunking algorithms take into account the distance between landmarks in order to, for example, avoid too small or too large chunks. Note that for such algorithms, not all landmarks will be designated chunk boundaries and not all chunk boundaries are located at landmark positions. In one example, a landmark may be considered to be located at any position in a data stream immediately following a new line character (the pattern). Landmark chunking a text file using the new line character as the landmark definition would partition the text file into a sequence of chunks, where lines of the text file may be separate chunks. Landmark definitions that are actually used in practice tend to be more complicated to enable proper handling of file types other than text files. For example, a position in a data stream can be defined as a landmark location if the immediately preceding 48 bytes of data has a particular calculated value, such as a Rabin fingerprint equal to −1 mod a predefined number related to the average desired chunk size.

A benefit of landmark chunking algorithms is that local changes are likely to disturb only a small number of chunks. For example, in a text file, adding a word to one line in the middle of the document only disturbs that line (chunk). In contrast, if a text file were to be simply divided into fixed-size 80-character records, an added word in the text file would cause every record after the added word to be changed, which leads to increased computer processing.

Conventional landmark chunking algorithms that are applied to large input data can be very computing-intensive. For example, in the data backup or archiving context, relatively large amounts of data are processed during the backup or archiving operation. If the landmark chunking algorithm is not performed efficiently, then the backup or archiving operation may take a long time to complete.

BRIEF DESCRIPTION OF THE DRAWINGS

Some embodiments of the invention are described with respect to the following figures.

DETAILED DESCRIPTION

Figure 1:
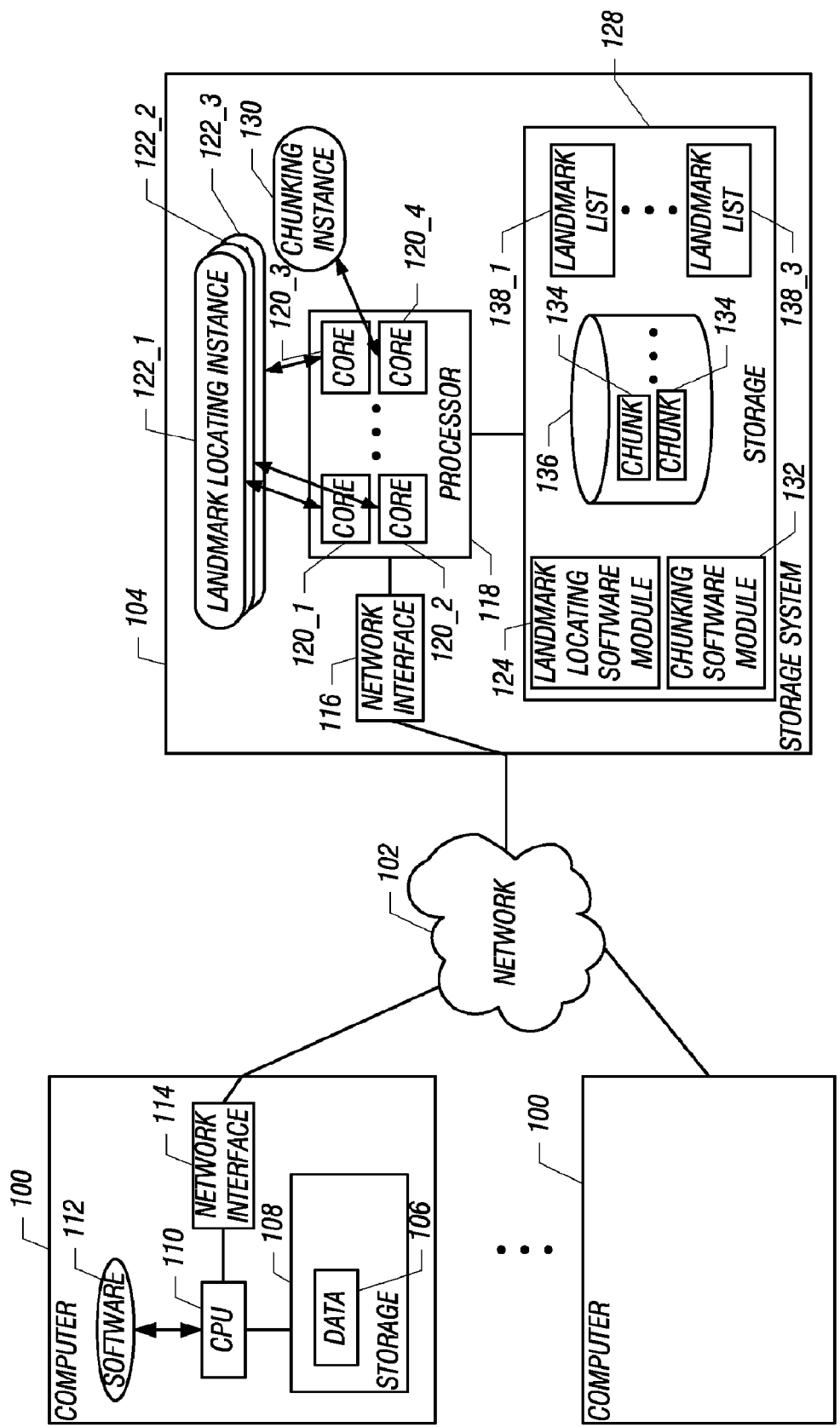
FIG. 1 is a block diagram of an exemplary arrangement in which an embodiment of the invention is incorporated.

In accordance with some embodiments, to improve the efficiency and processing speed of a chunking algorithm, input data is divided into multiple segments, and the multiple segments are processed, in parallel, by respective processing elements to locate landmarks in the segments. A landmark refers to a short sequence of bytes found within the input data that satisfies predetermined criteria. An example of the predetermined criteria includes applying a function to a portion of the input data—the short sequence of bytes—and determining whether the output of the function has some relation with respect to a threshold. Another example of the predetermined criteria includes determining whether a portion of the input data has certain characteristics (e.g., the input data portion has a certain character, is a new line, is a section break, etc.). The predetermined criteria may deal only with the intrinsic qualities of the byte sequence itself rather than extrinsic qualities like the location of the byte sequence or the data around the byte sequence. The locations of landmarks are used to derive chunk boundaries that are the endpoints of chunks of the input data. The task of identifying landmarks in the input data is typically the most computing-intensive part of any landmark chunking algorithm. By processing multiple segments in parallel to identify landmarks using multiple processing elements, the processing speed of a landmark chunking algorithm can be enhanced.

A "chunk" refers to an element of a partition of input data, where the input data can be in the form of a file or other data object. As examples, the input data can be a document (such as a document produced or edited by a software application), an image file, a video file, an audio file, a tape image, or any other collection or sequence of data. A "boundary" or "chunk boundary" refers to a position within the input data that defines an endpoint of a chunk. Two successive boundaries define the two endpoints of a corresponding chunk.

As noted above, a landmark chunking algorithm is used, in which the landmarks identified by the landmark chunking algorithm are used to derive the boundaries that define corresponding chunks. Note that not all landmarks necessarily define boundaries, and not all boundaries are landmarks. Landmarks are defined based on local content of the input data. For example, one technique of locating landmarks is to use a sliding window algorithm where, for each position within the input data, a fingerprint is computed for the sequence of data within the respective sliding window. The sliding window contains bytes within the input data that precedes the position of the input data being considered. If the computed fingerprint satisfies a particular criterion, the position is designated as a landmark. In one specific example, a position in the input file is a landmark if the immediately preceding 48 bytes (sliding window) have a Rabin fingerprint equal to −1 mod a predefined number related to the average desired chunk size. In other implementations, other fingerprints or other values computed from other functions can be computed based on the content of the input data. As yet another implementation, the landmarks can be predefined characters or other types of objects within the input data, such as a new line character, a paragraph break, a page break, and so forth.

Based on the identified landmarks, chunk boundaries can be determined using a landmark chunking algorithm. In some algorithms, to improve performance of chunking, minimum and maximum chunk sizes can be set. Thus, any landmark that is closer than a minimum chunk size following the previous chunk boundary is disregarded, since using such landmark as a chunk boundary would result in a chunk that would be considered too small.

Moreover, chunk sizes may not be allowed to exceed a maximum chunk size. If the chunking algorithm detects that no landmark has been detected in a region of the input data that starts at the previous chunk boundary and ends at a position that corresponds to the maximum chunk size, then the position corresponding to the maximum chunk size from the previous chunk boundary can be used as the next chunk boundary, in one implementation.

In an alternative implementation, the concept of primary and secondary landmarks can be used. Primary and secondary landmarks are computed based on the same input data value (such as the value of input data within a sliding window) but using different predetermined criteria—the concept here is that a secondary landmark is easier to detect than a primary landmark such that a secondary landmark would be more likely to be present within an input data region than a primary landmark. If a primary landmark is found in a region of input data that is between [previous chunk boundary+minimum chunk size] and [previous chunk boundary+maximum chunk size], then the first such primary landmark would be used as the next chunk boundary. The position [previous chunk boundary+minimum chunk size] refers to a position that is equal to the position of the previous chunk boundary plus the minimum chunk size. The position [previous chunk boundary+maximum chunk size] refers to a position that is equal to the position of the previous chunk boundary plus the maximum chunk size.

If a primary landmark is not found in the region between [previous chunk boundary+minimum chunk size] and [previous chunk boundary+maximum chunk size], then the chunking algorithm determines if a secondary landmark is present in the region—if so, then the last such secondary landmark is used as the chunk boundary. If no secondary landmark is found in this region, then the position [previous chunk boundary+maximum chunk size] is used as the next chunk boundary.

Details regarding the above chunking algorithm in which minimum and maximum chunk sizes are set and in which primary and secondary landmarks are generated are described further in U.S. Pat. No. 7,269,689. In other embodiments, other chunking algorithms for determining chunk boundaries can be employed.

The multiple processing elements to process respective segments of the input data in parallel to find landmarks (primary and/or secondary landmarks) can be distinct processors that are provided in one or more computers or other types of electronic devices (e.g., storage devices, communications devices, etc.). Alternatively, the multiple processing elements can be separate cores of a multi-core processor. The multiple cores of a processor are independent cores that are packaged into a single integrated circuit, such as a single die or multiple dies that are packaged together. Each core of the processor is able to independently perform execution of a respective set of instructions, such as instructions of distinct threads or processes.

As noted above, the most computing-intensive aspect of a landmark chunking algorithm can be the computations involved in finding landmarks (primary and/or secondary landmarks). By locating landmarks using multiple processing elements in parallel, the landmarks of a relatively large input data can be more quickly located, such that the landmark chunking algorithm can proceed at a more rapid pace.

FIG. 1 illustrates an exemplary arrangement that includes computers 100 connected over a network 102 to a storage system 104. In one example, the storage system can be a backup storage system or an archiving storage system to back up or archive data 106 contained in respective computers 100. In FIG. 1, components of one of the computers 100 are depicted, with the other computers containing the same or similar components.

Although multiple computers 100 are shown, it is noted that a single computer 100 can be used in another implementation.

Each computer 100 includes a storage 108 (e.g., disk-based storage, integrated circuit storage, etc.) to store the data 106. A central processing unit (or multiple central processing units) 110 is (are) connected to the storage 108, and software 112 (application software, operating system software, etc.) is executable on the CPU(s) 110.

A network interface 114 is provided in each computer 100 to communicate the data 106 over the network 102 to the storage system 104. The storage system 104 accepts the data 106 from the multiple computers 100 as input data that is subjected to a landmark chunking algorithm, in accordance with some embodiments. Although the chunking algorithm according to some embodiments is performed at the storage system 104 in one specific example, it is noted that the chunking algorithm can alternatively be performed elsewhere in the network arrangement depicted in FIG. 1, such as in any one of the computers 100. The landmark chunking algorithm according to some embodiments is advantageously performed in the storage system 104 since the storage system 104 is used to store data associated with multiple computers 100, such that the amount data that is processed at the storage system 104 can be relatively large.

Input data from the computers 100 communicated over the network 102 is received by a network interface 116 in the storage system 104. The network interface 116 is in turn connected to a processor 118, which has multiple cores 120_1, 120_2, 120_3, and 120_4. The number of cores in the processor 118 can differ in different implementations.

Although the storage system 104 is depicted as including a multi-core processor 118, it is noted that in an alternative embodiment, multiple distinct processors 118 can be provided in the storage system 104, where each of such distinct processors 118 can be a single-core or multi-core processor.

In accordance with some embodiments, multiple landmark locating software instances 122_1, 122_2, and 122_3 are executable on corresponding cores 120_1, 120_2, and 120_3 of the processor 118 to locate landmarks in corresponding segments of the input data. The landmark locating software instances 122_1 to 122_3 can be multiple threads or processes that are spawned from a landmark locating software module 124 stored in a storage 128 in the storage system 104. The multiple landmark locating software instances 122_1, 122_2, and 122_3 spawned from the landmark locating software module 124 are executed in parallel on the cores 120_1 to 120_3 of the processor 118 to process respective segments of the input data.

In addition to the landmark locating software instances 122_1 to 122_3, a chunking software instance 130 is spawned from a chunking software module 132 in the storage 128. The chunking software instance 130 is executable on the core 120_4 of the processor 118 to perform chunking of the input data to produce chunks based on the landmarks identified by the landmark locating software instances 122_1 to 122_3. The unique chunks are stored as chunks 134 in a database 136 or other storage structure of the storage 128. A benefit of chunking input data into chunks is that deduplication of data can be applied. Data objects may share common data portions, By partitioning data objects into chunks, the chunks corresponding to the common data portions can be stored just once to avoid storing duplicate data, which is wasteful of storage resources.

The output produced by each landmark locating software instance 122_1 to 122_3 is a landmark list that lists landmarks identified by the respective landmark locating software instance in the corresponding segment of the input data. In FIG. 1, three landmark lists 138_1 to 138_3 are created by the three respective landmark locating software instances 122_1 to 122_3. Alternatively, the landmarks identified by the multiple landmark locating software instances can be provided in one landmark list. The landmark list(s) is (are) accessed by the chunking software instance 130 to produce the chunks 134.

Figure 2:
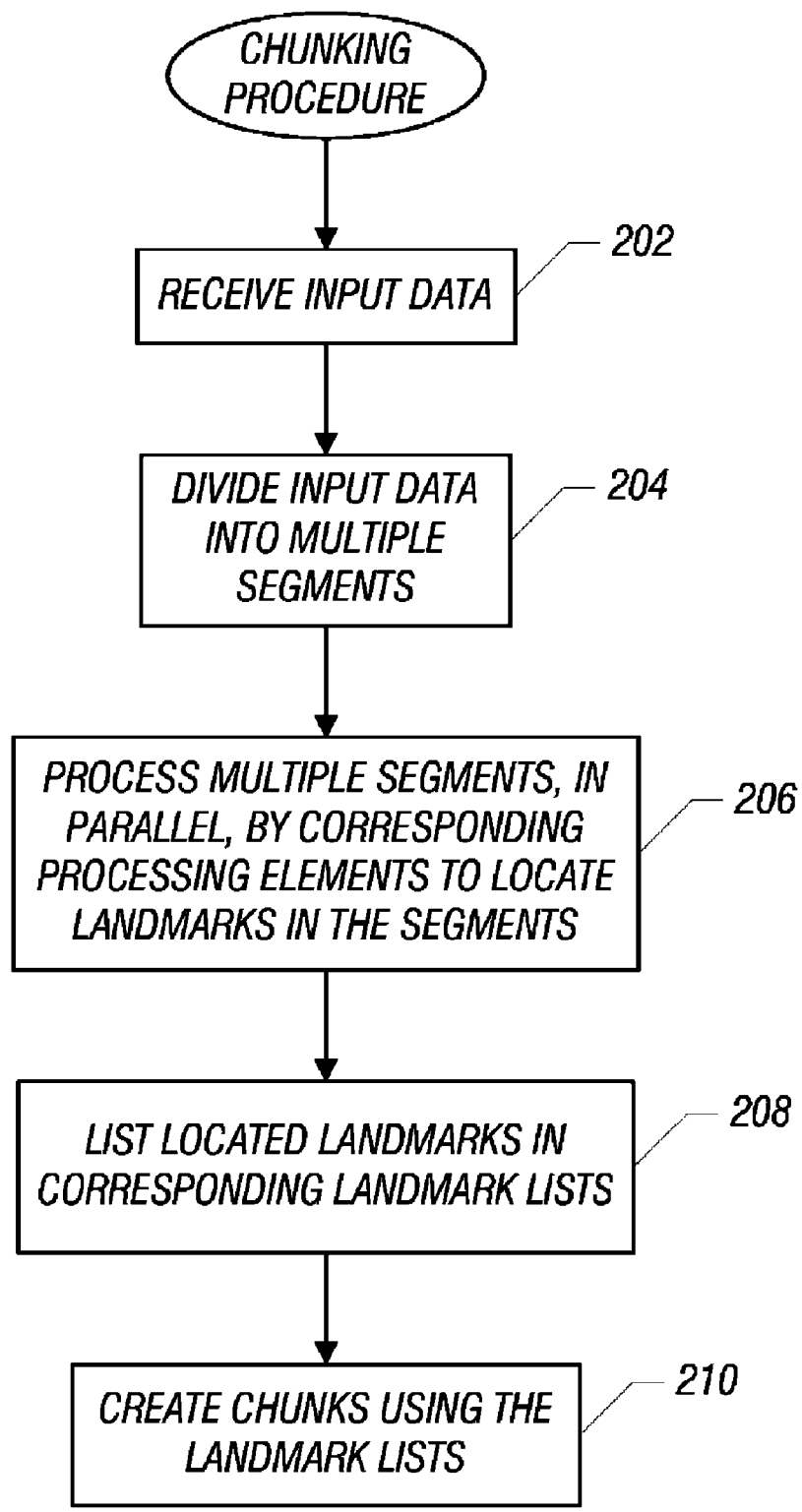
FIG. 2 is a flow diagram of a process of performing a landmark chunking algorithm, according to an embodiment.

FIG. 2 is a flow diagram of a chunking procedure in accordance with an embodiment. Input data is received (at 202), such as input data received by the storage system 104 from multiple computers 100. The received input data is divided (at 204) into multiple segments. Assuming there are n processing elements (such as the n cores in the processor 118 of FIG. 1), the input data is divided into n−1 segments, in one embodiment. In alternative embodiments, the input data can be divided into n−2 segments, or less.

The multiple segments are processed, in parallel, by corresponding processing elements to locate landmarks in the respective segments. Thus, in the example of FIG. 1, the landmark locating software instances 122_1 to 122_3 when executed on respective cores 120_1 to 120_3 process corresponding multiple segments of the input data to locate landmarks in such segments. The located landmarks are then listed (at 208) in corresponding landmark lists, such as the landmark lists 138_1 to 138_3 in FIG. 1. The listed landmarks can include primary landmarks and/or secondary landmarks. In other embodiments, there is just one type of landmark. If primary and secondary landmarks are used, then each landmark list can include indicators of whether an identified landmark is a primary landmark or secondary landmark.

Next, the chunking software instance 130 creates (at 210) chunks using the landmark lists created by the landmark locating software instances 122_1 to 122_3. The landmarks contained in the landmark lists are used to derive boundaries of chunks. In one example, minimum and maximum chunk size thresholds can be set, as described above, where any landmarks located in a region between a previous chunk boundary and a position corresponding to a minimum chunk size after the previous chunk boundary are disregarded. Once landmarks are identified (which can involve computing-intensive operations such as calculations of fingerprints or other functions), then the chunk software instance 130 can quickly produce chunks based on the identified landmarks.

In one example, assuming that the input data is to be divided into three segments, then the input data can be divided as follows: ABCABCABCABCABC . . . . In this example, instead of dividing the input data into three long discrete segments, the three segments are interleaved with each other. In other words, each segment A, B, or C is divided into pieces that are interleaved. In this example, segment A is processed by a first core (core A), segment B is processed by a second core (core B), and segment C is processed by a third core (core C). Core A searches each piece labeled A for landmarks, and produces a list of landmarks for the data of these pieces. In one embodiment, core A starts at the left and works towards the right within each piece of segment A. Core B performs similar operations on pieces labeled B, and core C performs a similar procedure on pieces labeled C.

The core executing the chunking software instance 130 uses the landmark lists produced by the other cores as input, so that the core executing the chunking software instance 130 does not have to scan the input data to locate landmarks. Note that the chunking software instance 130 can actually be executed in parallel with the landmark locating software instances 122_1 to 122_3, such that the chunking software instance 130 is able to access the landmark lists while the landmark lists are being updated by the landmark locating software instances.

As the chunking software instance 130 proceeds from piece to piece, it may switch back and forth between the various landmark lists. For example, it may use the landmark list created by Core A when dealing with a piece A then use the landmark list created by Core B to deal with a following piece B.

In some embodiments, concurrency control is performed so that the core executing the chunking software instance 130 does not attempt to access a part of a landmark list before that part of that landmark list is ready. Thus, initially, the core executing the chunking software instance 130 may have to wait until core A has finished its first piece before the core executing the chunking software instance 130 can begin the chunking procedure. If finer-grained concurrency control is used, the core executing the chunking software instance may only have to wait until core A has produced some landmark information.

Instructions of software described above (including the landmark locating software instances 122_1 to 122_3 and chunking software instance 130 of FIG. 1) are loaded for execution on respective processing elements (such as processor cores 120_1 to 120_4 in FIG. 1). A processing element can include a microprocessor, a core of a microprocessor, a microcontroller, a processor module or subsystem (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method, comprising:
dividing input data into a plurality of segments;
processing the plurality of segments, in parallel, by respective first processing elements to locate landmarks in the segments, wherein the first processing elements include corresponding processors or cores of at least one processor, wherein locating the landmarks comprises:
computing a fingerprint on corresponding local content of the input data, wherein the corresponding local content is defined by a sliding window, and
designating a position associated with the corresponding local content as a landmark if the corresponding computed fingerprint satisfies a criterion; and
using at least one other processing element to produce chunks from the input data based on positions of the landmarks provided by the first processing elements.

2. The method of claim 1, wherein producing the chunks comprises using the landmarks to derive chunk boundaries of the chunks, wherein not all landmarks are chunk boundaries.

3. The method of claim 2, wherein deriving the chunk boundaries using the landmarks comprises considering preset minimum and maximum chunk sizes.

4. The method of claim 1, further comprising:
generating at least one list by the first processing elements, wherein the list identifies the located landmarks.

5. The method of claim 1, wherein processing the plurality of segments, in parallel, by the respective first processing elements comprises processing the plurality of segments by the processors.

6. The method of claim 1, wherein processing the plurality of segments, in parallel, by the respective first processing elements comprises processing the plurality of segments by the cores.

7. The method of claim 1, further comprising performing a data backup or archiving operation that includes the dividing, processing, and using tasks.

8. The method of claim 1, wherein each of at least some of the chunks includes a respective partition of the input data defined by chunk boundaries corresponding to positions of a respective pair of the landmarks.

9. A system comprising:
a plurality of processing elements, wherein the processing elements include corresponding processors or cores of at least one processor; and
landmark locating software instances executable on a subset of the plurality of processing elements to:
process, in parallel, corresponding segments of input data to find landmarks in the corresponding segments, wherein finding the landmarks comprises:
computing a fingerprint on corresponding local content of the input data, wherein the corresponding local content is defined by a sliding window, and
designating a position associated with the corresponding local content as a landmark if the corresponding computed fingerprint satisfies a criterion, and
generate an output identifying the landmarks;
at least one chunking software instance executable on at least another one of the plurality of processing elements to:
divide the input data into chunks based on the output identifying the landmarks.

10. The system of claim 9, wherein the output identifying the landmarks includes a plurality of landmark lists generated by respective landmark locating software instances, and wherein each of the landmark lists identifies respective landmarks.

11. The system of claim 9, wherein the segments of the input data are interleaved with respect to each other.

12. The system of claim 9, wherein the at least one chunking software instance is to derive chunk boundaries of the chunks based on the identified landmarks.

13. The system of claim 9, further comprising a network interface to receive the input data from multiple computers over a network, wherein the system is to perform backup copying or archiving of the input data.

14. The system of claim 9, wherein chunk boundaries defining respective ones of the chunks are derived from the landmarks in which preset minimum and maximum chunk sizes are considered.

15. The system of claim 9, wherein each of at least some of the chunks includes a respective partition of the input data defined by chunk boundaries corresponding to positions of a respective pair of the landmarks.

16. An article comprising at least one non-transitory computer-readable storage medium containing instructions that when executed cause a computer to:
process a plurality of segments of input data, in parallel, by respective first processing elements to locate landmarks in the segments, wherein locating the landmarks comprises:
computing a fingerprint on corresponding local content of the input data, wherein the corresponding local content are defined by a sliding window,
designating a position associated with the corresponding local content as a landmark if the corresponding computed fingerprint satisfies a criterion; and
use at least one other processing element to produce chunks from the input data based on output of the first processing elements.

17. The article of claim 16, wherein the instructions when executed cause the computer to further derive chunk boundaries using the landmarks in which preset minimum and maximum chunk sizes are considered, the chunk boundaries defining the chunks.

18. The article of claim 16, wherein the instructions when executed cause the computer to further perform a data backup or archiving operation that includes the processing and using tasks.

19. The article of claim 16, wherein each of at least some of the chunks includes a respective partition of the input data defined by chunk boundaries corresponding to positions of a respective pair of the landmarks.

* * * * *